United States Patent Office 2,901,814
Patented Sept. 1, 1959

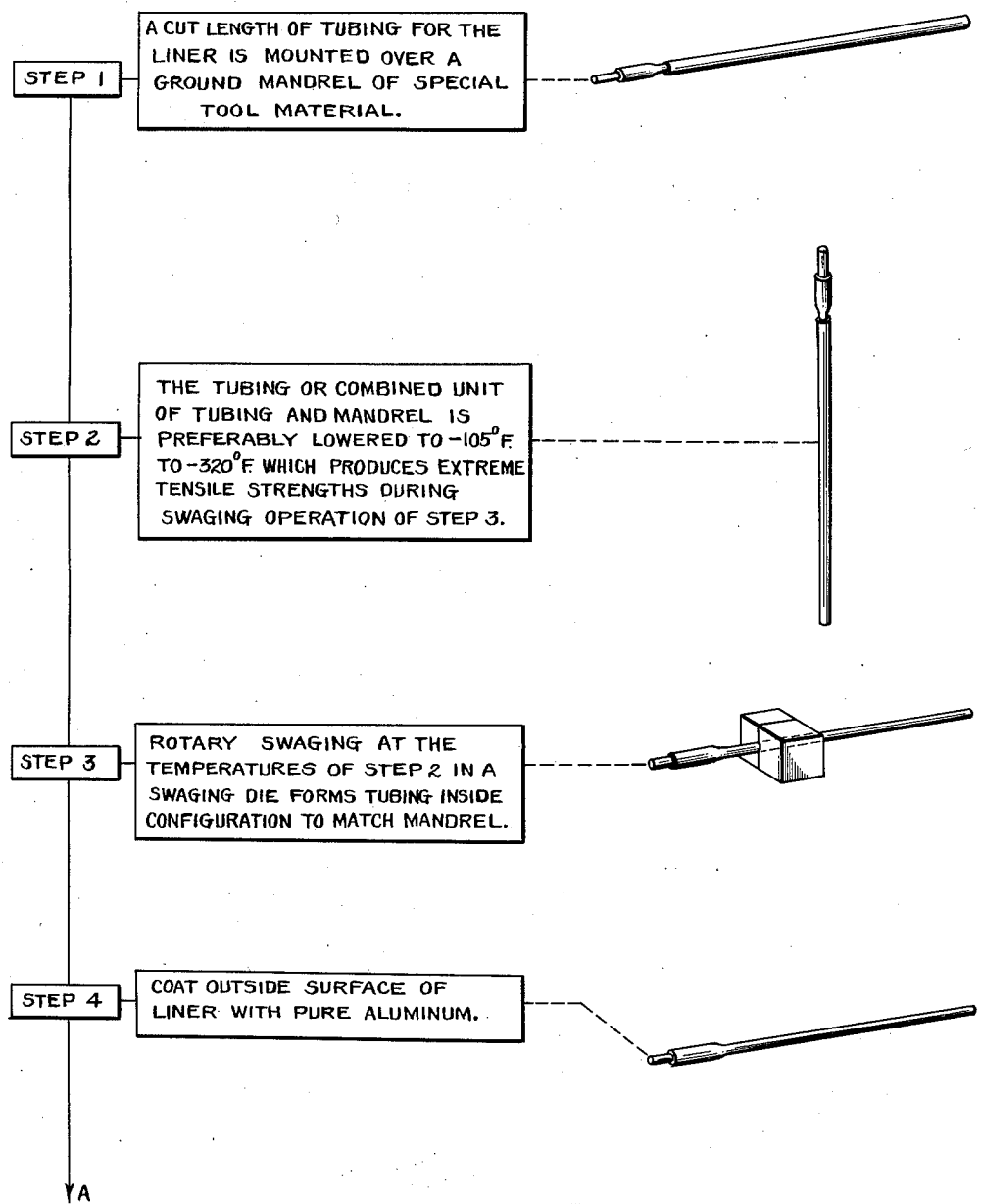

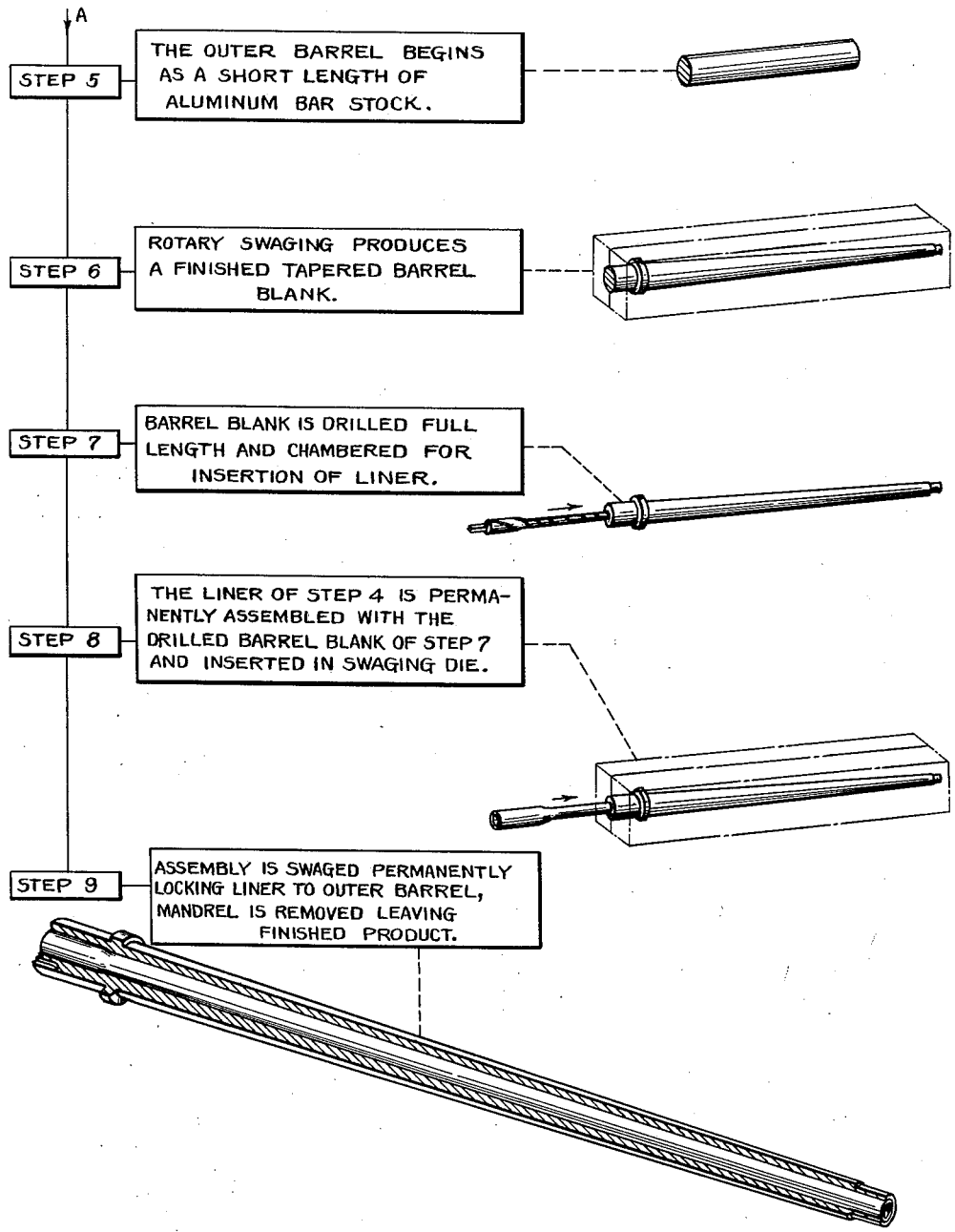

2,901,814
METHOD OF MANUFACTURING GUN BARRELS

George C. Sullivan, Hollywood, Calif.

Application April 2, 1956, Serial No. 575,607

13 Claims. (Cl. 29—1.1)

This invention relates to the manufacture of gun barrels and in particular to those barrels having rifling, and more particularly to light weight barrels made from aluminum alloys or the like and having a rifled liner.

Heretofore, gun barrels have been manufactured from a single piece of stock which has been drilled and the bore machined to form rifling. Such a machining operation is costly, time consuming, and often times results in inaccuracies in the rifling. Machining of the bore does not produce a fine surface finish on the inside of the bore. A study of the inside of a machined barrel usually discloses many grooves and ridges under a microscope. These grooves and ridges on the inside of the bore usually effect the accuracy of the weapon to which the barrel is affixed. Machining in addition to scoring sometimes warps the barrel which then requires straightening and attendant inaccuracy.

It is an object of this invention to provide a method of manufacturing gun barrels which is simple and inexpensive.

A further object of this invention is to provide a method of manufacturing gun barrels which increases production and cuts down on time expended.

It is another object of this invention to provide a method of manufacturing gun barrels which increases the tensile strength of the barrel without substantial loss of ductility.

It is a further object of this invention to provide a method of manufacturing gun barrels which produces an excellent surface finish.

Still another object of this invention is to provide a method of manufacturing gun barrels wherein the liner can be constructed of higher strength materials than the barrel itself.

Still another object of this invention is to provide a barrel which has excellent heat dissipation characteristics.

Still another object of this invention is to provide a swaged bore and chamber in one operation.

A still further object of this invention is to provide a method of manufacturing gun barrels which reduces the amount of material needed.

Still another object of this invention is to provide a method of manufacturing non-ferrous metal barrels having a liner.

Yet another object of this invention is to provide a method of manufacturing liners for gun barrels.

These and other objects and advantages of this invention will be apparent from the following description and claims.

In the accompanying drawings which illustrate by way of example the various embodiments of this invention;

Plate I shows steps 1 through 4 of the method of manufacturing liners for gun barrels; and Plate II shows steps 5 through 9 of the method of manufacturing or completing gun barrels.

Referring more particularly to the drawings, steps 1 through 4 relate to the method of manufacturing the liner for the barrel and steps 5 through 9 relate to the method of manufacturing the barrel, inserting the liner therein, and uniting the barrel to the liner.

More specifically in step 1, a cut length of thin walled tubing, such as stainless steel, is mounted over a shaped mandrel of special tool steel having the desired rifling machined or ground thereon. The final contour of the cartridge chamber can also be included in the mandrel design. It is obvious that the mandrel can be machined or ground with lands and grooves thereon with much greater accuracy than can the inside of a tube. It is also possible to grind or machine other rifling configurations not possible in a tube or the tubing alone.

In step 2, the combined unit of the mandrel and tubing are chilled to temperatures ranging from $-105°$ F. to $-320°$ F. This step is not necessary, but desirable in that it results in a higher strength liner.

In step 3, a rotary swaging of the chilled units forms the tubings inside configuration to match that of the mandrels outside configuration with extreme accuracy. Working the tubing at the chilled temperatures of between $-105°$ F. and $-320°$ F. produces tensile strengths of up to 250,000 pounds per square inch without appreciable loss of ductility.

The chilling of step 2 greatly improves the strength of the barrel but for those barrels which do not require extreme tensile strength, the chilling step may be eliminated. The process of this invention also contemplates working cold non-chilled metal, since cold swaging improves the metallurgy of the metal and eliminates the distortion problems of post heat treat.

In step 4, the outside surface of the liner may be tinned or coated with a bonding material for the outer tube or barrel thus providing a joint which is more efficient for the passing of heat from the liner to the outer barrel and to the atmosphere. For aluminum alloy barrels, the coating should consist of pure aluminum.

After step 4 of the process, the coating step, the tube or outer barrel is conformed over the liner by methods hereinafter described.

The outer barrel as illustrated in step 5 begins as a short length of aluminum bar stock of sufficient mass to form a tapered barrel blank without the necessity of machining off excess material. Rotary swaging produces a tapered barrel blank as illustrated in step 6 which barrel blank is drilled, as in step 7, the full length for insertion of the liner. The drilled hole is then enlarged at the breech end of the barrel to provide for the chamber area of the liner. The outer barrel of step 6 can also be fabricated by conventional machining means if desired, thus eliminating the necessity for the swaging die.

After the barrel blank has been drilled and chambered, the liner as produced in steps 1, 2, 3 and 4 with the mandrel inserted therein, is inserted into the outer barrel or tube as illustrated in step 8 and the assembly is returned to a swaging die similar to that of step 6 except of smaller internal dimension. The assembly is then swaged as in step 9 to permanently lock the barrel to the liner. The finished product is a distortion free barrel capable of operating at temperatures limited only by the alloys used. The mandrel, properly lubricated, will normally be removable from the finished product, however, if trouble is encountered in this respect, it can be removed by heating the product thus taking advantage of the different coefficients of expansion and contraction of the two metals.

The shaped mandrel utilized in steps 1, 2 and 3 may be removed after the swaging operation of step 3 is completed. In this event, a supporting mandrel should be inserted in the liner prior to swaging the barrel blank onto the liner in step 9.

In the preferred operation, the liner is of a harder material than the outer barrel or tube which is preferably of a non-ferrous nature, such as an aluminum alloy.

The liner may be of special steel such as stainless steel, chrome-molybdenum or other similar type hard durable metals. Unlike steel barrels, drilling in aluminum alloys can produce holes straight over the full length of the barrel to an accuracy of .0005 inch and a dimensional accuracy in diameter and in other respects of .0002 inch. The instant method of utilizing bar stock permits 60% reduction of the material required for machining a barrel, since only 40% of the material formerly used is required.

In the process mentioned above, the swaging of step 3 may be carried out in such a manner as to provide a taper to the liner. This feature is of great merit in that it permits higher muzzle velocities which means more killing power. It also assists in the removal of the mandrel.

By use of a tapered mandrel, the tapering of the liner is in the direction of the breech end with the lesser bore diameter at the muzzle. This is done in order to improve the firing power of the assembled rifle.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:

1. The method of manufacturing light weight gun barrels having a liner comprising the steps of mounting upon a shaped mandrel a cut length of tubing to provide an assembled unit, chilling the combined unit at an extremely cold temperature, swaging the chilled tubing about the chilled mandrel to form a liner the inside configuration of which matches the mandrel, separating the mandrel from the liner, aluminum coating the outside surface of the liner, swaging a short length of aluminum alloy bar stock to a finished tapered barrel blank, drilling the barrel blank its full length, inserting a supporting mandrel in said liner, inserting said liner and supporting mandrel into said drilled barrel blank, swaging the drilled barrel blank about said liner to permanently lock said liner to the drilled barrel blank to form a barrel, and withdrawing the supporting mandrel from the barrel.

2. The method of manufacturing light weight gun barrels as in claim 1, wherein the liner is of stainless steel and the chilling temperature is from between −105° F. to −320° F.

3. The method of manufacturing light weight gun barrels as in claim 1 and having the steps of chambering the breech end of the liner and the breech end of the barrel blank.

4. The method of manufacturing light weight gun barrels having a liner comprising the steps of mounting upon a shaped mandrel a cut length of hard metal tubing to provide an assembled unit, swaging the tubing about the mandrel to form a liner the inside configuration of which matches the mandrel, aluminum coating the outside surface of the liner, swaging a short length of aluminum alloy bar stock to a tapered barrel blank, drilling said barrel blank its full length, inserting said liner into said drilled barrel blank, and swaging said drilled barrel blank about said liner to permanently lock said liner to said outer barrel blank to form a barrel, and withdrawing the supporting mandrel from the barrel.

5. The method of manufacturing light-weight gun barrels having a liner comprising the steps of chilling a cut length of thin walled stainless steel tubing at a temperature of from between −105° F. to −320° F., mounting said tubing upon a shaped mandrel of special tool steel to provide an assembled unit, swaging said chilled tubing about said mandrel to form a liner, the inside configuration of which matches the mandrel, drilling an aluminum barrel blank its full length, inserting said liner into said drilled barrel blank, and rotary swaging said drilled barrel blank about said liner to permanently lock said liner to said barrel blank, to form a barrel, and withdrawing the supporting mandrel from the barrel.

6. The method of manufacturing a light weight gun barrel having a liner comprising the steps of mounting upon a shaped mandrel a cut length of tubing to provide an assembled unit, swaging the tubing about said mandrel to form a liner the inside configuration of which matches the mandrel, swaging a length of bar stock to a tapered barrel blank, drilling the barrel blank its full length, inserting said liner into said drilled barrel blank, and swaging said drilled barrel blank about said liner to permanently lock said liner to said barrel blank to form a barrel, and withdrawing the supporting mandrel from the barrel.

7. The method of manufacturing a light weight gun barrel as in claim 6 and having the steps of chambering the breech end of the liner and the breech end of the barrel blank.

8. The method of manufacturing light weight gun barrels having a liner comprising swaging a length of aluminum bar stock into a tapered barrel blank, drilling the barrel blank its full length, inserting said liner into said drilled barrel blank, and swaging the drilled barrel blank upon said liner to permanently lock said liner to said outer barrel blank to form a barrel, and withdrawing the supporting mandrel from said barrel.

9. The method of manufacturing a lightweight gun barrel having a liner comprising the steps of mounting upon a shaped mandrel a cut length of tubing to provide an assembled unit, swaging the tubing upon said mandrel to form a liner the inside configuration of which matches the mandrel, drilling a barrel blank its full length, inserting said liner into said drilled barrel blank and swaging said drilled barrel blank upon said liner to lock said liner to said barrel blank to form a finished barrel, and withdrawing the mandrel from the composite barrel.

10. The method of manufacturing a lightweight gun barrel having a liner comprising the steps of mounting upon a shaped mandrel a cut length of tubing to provide an assembled unit, swaging the tubing upon said mandrel to form a liner the inside configuration of which matches the mandrel, drilling and swaging a length of bar stock to form a barrel blank, inserting said liner into said barrel blank and swaging said barrel blank about said liner to lock said liner to said barrel blank to form a composite barrel, and withdrawing the mandrel from the barrel.

11. A method of manufacturing a lightweight gun barrel as in claim 10 and having the steps of chambering the breech end of the liner and the breech end of the barrel blank.

12. The method of manufacturing a light weight gun barrel having a liner comprising the steps of drilling a barrel blank its full length, mounting a cut length of tubing upon a shaped mandrel, inserting said tubing and mandrel into said barrel blank to provide an assembled unit, swaging said assembled unit to lock said barrel blank to said tubing and to conform the inside of said tubing to said mandrel, and withdrawing said mandrel from said barrel.

13. The method of manufacturing a gun barrel having a liner comprising the steps of forming an aluminum alloy barrel blank having an annular opening, mounting a length of steel tubing on a shaped mandrel, coating said tubing with pure aluminum, inserting said tubing and mandrel into said barrel blank to provide an assembled unit, chilling said assembled unit, swaging said assembled unit to lock said barrel blank to said tubing and to conform the inside of said tubing to said mandrel, and withdrawing said mandrel from said barrel.

(References on following page)

References Cited in the file of this patent

UNITED STATES PATENTS

| | | |
|---|---|---|
| 348,719 | Brown | Sept. 7, 1886 |
| 930,927 | Berkstresser | Aug. 10, 1909 |
| 1,316,509 | Rose | Sept. 16, 1919 |
| 1,427,100 | Gilbert | Aug. 29, 1922 |
| 2,104,319 | Dicke | Jan. 4, 1938 |
| 2,397,544 | Garand | Apr. 2, 1946 |
| 2,499,944 | Brace et al. | Mar. 7, 1950 |
| 2,527,287 | Ziegler et al. | Oct. 24, 1950 |
| 2,663,410 | Kessler | Dec. 22, 1953 |

FOREIGN PATENTS

| | | |
|---|---|---|
| 102,369 | Great Britain | Dec. 7, 1916 |